(12) United States Patent
Liu et al.

(10) Patent No.: US 11,915,029 B2
(45) Date of Patent: Feb. 27, 2024

(54) SYSTEM AND METHOD OF MANAGING AVAILABLE MEMORY OF AN INFORMATION HANDLING SYSTEM

(71) Applicant: Dell Products L.P., Round Rock, TX (US)

(72) Inventors: Wei G. Liu, Austin, TX (US); Yi-Shu Hung, Taipei (TW)

(73) Assignee: Dell Products L.P., Round Rock, TX (US)

( * ) Notice: Subject to any disclaimer, the term of this patent is extended or adjusted under 35 U.S.C. 154(b) by 545 days.

(21) Appl. No.: 17/221,316

(22) Filed: Apr. 2, 2021

(65) Prior Publication Data
US 2022/0318043 A1    Oct. 6, 2022

(51) Int. Cl.
*G06F 9/455* (2018.01)

(52) U.S. Cl.
CPC .............. *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,295,258 A | 3/1994 | Jewett et al. |
| 5,857,074 A | 1/1999 | Johnson |
| 5,892,928 A | 4/1999 | Wallach et al. |
| 5,905,867 A | 5/1999 | Giorgio |

OTHER PUBLICATIONS

Redfish Scalable Platforms Management API Specification, Distributed Management Task Force, Inc., Version 1.6.1, Dec. 13, 2018, DSP0266.
Redfish Interoperability Profiles, Distributed Management Task Force, Inc., Version 1.0.1, May 15, 2018, DSP0272.
Redfish Host Interface Specification, Distributed Management Task Force, Inc., Version 1.0.1, Dec. 11, 2017, DSP0270.
Redfish—Simple and Secure Management for Converged, Hybrid IT, Technical Notes, Distributed Management Task Force, Inc., Nov. 2018.
Autor, Jeff. Introduction to Redfish, DMTF Scalable Platforms Management Forum, May 2015.
(Continued)

*Primary Examiner* — Wynuel S Aquino
(74) *Attorney, Agent, or Firm* — McDermott Will & Emery LLP

(57) ABSTRACT

In one or more embodiments, one or more systems, one or more methods, and/or one or more processes may receive a first license associated with a first amount of physical storage to permit an operating system (OS) and/or a hypervisor to utilize; initialize a data structure with first information associated with the first amount of the physical storage; retrieve the first information associated with the first amount of the physical storage from the data structure; receive a second license associated with a second amount of the physical storage, greater than the first amount, to permit the OS and/or the hypervisor to utilize; update the data structure with second information associated with the second amount of the physical storage; receive a notification associated with the second amount of the physical storage; and retrieve the second information associated with the second amount of the physical storage from the data structure.

20 Claims, 7 Drawing Sheets

(56) References Cited

OTHER PUBLICATIONS

Management Component Transport Protocol (MCTP) SMBus/I2C Transport Binding Specification, Distributed Management Task Force, Inc., Version 1.1.0, May 21, 2017.

Management Component Transport Protocol (MCTP) Base Specification, Includes MCTP Control Specifications, Distributed Management Task Force, Inc., Version 1.3.0, Nov. 24, 2016.

Management Component Transport Protocol (MCTP) Overview, Distributed Management Task Force, Inc., Version 1.0.0a, Jul. 2007, DSP2016.

Compaq ProLiant 7000 Server Technology, Technology Brief, Second Edition, Jun. 1998.

Intelligent Platform Management Bus Communications Protocol Specification, v1.0, Intel Hewlett-Packard NEC Dell, Nov. 15, 1999.

Zhuo, Haihong, Jianwen Yin, and Anil V. Rao. "Remote management with the baseboard management controller in eighth-generation Dell Poweredge servers." *Magazine of Dell Power Solutions* (2004): 26-29.

Intelligent Platform Management Interface Specification, v2.0, Intel Hewlett-Packard NEC Dell, Oct. 1, 2013.

Eliminating Single Points of Failure and Enabling Rapid Recovery in Server Subsystems, Technology Brief, Compaq Computer Corporation, Nov. 1997.

Rekhter, Yakov, et al. *Address allocation for private internets.* No. RFC 1918. 1996.

Cheshire, Stuart, et al. *Understanding apple's back to my mac (BTMM) service.* No. RFC 6281. 2011.

Fleishman. G. (Nov. 7, 2007). Back to My Mac: Apple's Internet mashup. Retrieved from https://www.macworld.com/article/1060946/backtomymac_side.html.

Remote Server Management Integrated Remote Console, Compaq. com, First Edition, Oct. 1996.

Brown, Len. "ACPI in Linux." *Linux Symposium.* vol. 51. 2005.

System Management BIOS (SMBIOS) Reference Specification—Distributed Management Task Force, Inc., Version 3.2.0, Apr. 26, 2018.

Chen, Tang. Introduction to ACPI Based Memory Hot-Plug, 2013.

SYSTEM AND METHOD OF MANAGING AVAILABLE MEMORY OF AN INFORMATION HANDLING SYSTEM

BACKGROUND

Field of the Disclosure

This disclosure relates generally to information handling systems and more particularly to managing available memory of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine, by information handling system firmware, an amount of physical storage of an information handling system; may receive, by the information handling system firmware, a first license associated with a first amount of the physical storage to permit at least one of an operating system (OS) and a hypervisor to utilize; may initialize, by the information handling system firmware, a data structure with first information associated with the first amount of the physical storage; may execute, by the at least one processor, the at least one of the OS and the hypervisor; may retrieve, by the at least one of the OS and the hypervisor, the first information associated with the first amount of the physical storage from the data structure; may allocate, by the at least one of the OS and the hypervisor, the first amount of the physical storage to first multiple applications executing on the information handling system without exceeding the first amount of the physical storage; may receive, by the information handling system firmware, a second license associated with a second amount of the physical storage, greater than the first amount of the physical storage, to permit the at least one of the OS and the hypervisor to utilize; may update, by the information handling system firmware, the data structure with second information associated with the second amount of the physical storage; may receive, by the at least one of the OS and the hypervisor, a notification associated with the second amount of the physical storage; may retrieve, by the at least one of the OS and the hypervisor, the second information associated with the second amount of the physical storage from the data structure; and may allocate, by the at least one of the OS and the hypervisor, the second amount of the physical storage to second multiple applications executing on the information handling system without exceeding the second amount of the physical storage. In one or more embodiments, retrieving the second information associated with the second amount of the physical storage from the data structure may be performed in response to receiving the notification.

In one or more embodiments, the one or more systems, the one or more methods, and/or the one or more processes may further provide, by the information handling system firmware, the notification associated with the second amount of the physical storage to the at least one of the OS and the hypervisor. In one or more embodiments, providing the notification may include generating an interrupt that signals a hot add of additional storage to the at least one of the OS and the hypervisor. In one or more embodiments, the first information associated with the first amount of the physical storage may include a starting address of the physical storage and a first ending address of the physical storage. In one or more embodiments, the second information associated with the second amount of the physical storage may include the starting address of the physical storage and a second ending address of the physical storage. In one or more embodiments, allocating the first amount of the physical storage to the first multiple applications may include allocating portions of the first amount of the physical storage between the starting address and the first ending address. In one or more embodiments, allocating the second amount of the physical storage to the second multiple applications may include allocating portions of the second amount of the physical storage between the starting address and the second ending address. In one or more embodiments, the second multiple applications may include the first multiple applications. In one or more embodiments, the physical storage may be volatile memory.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
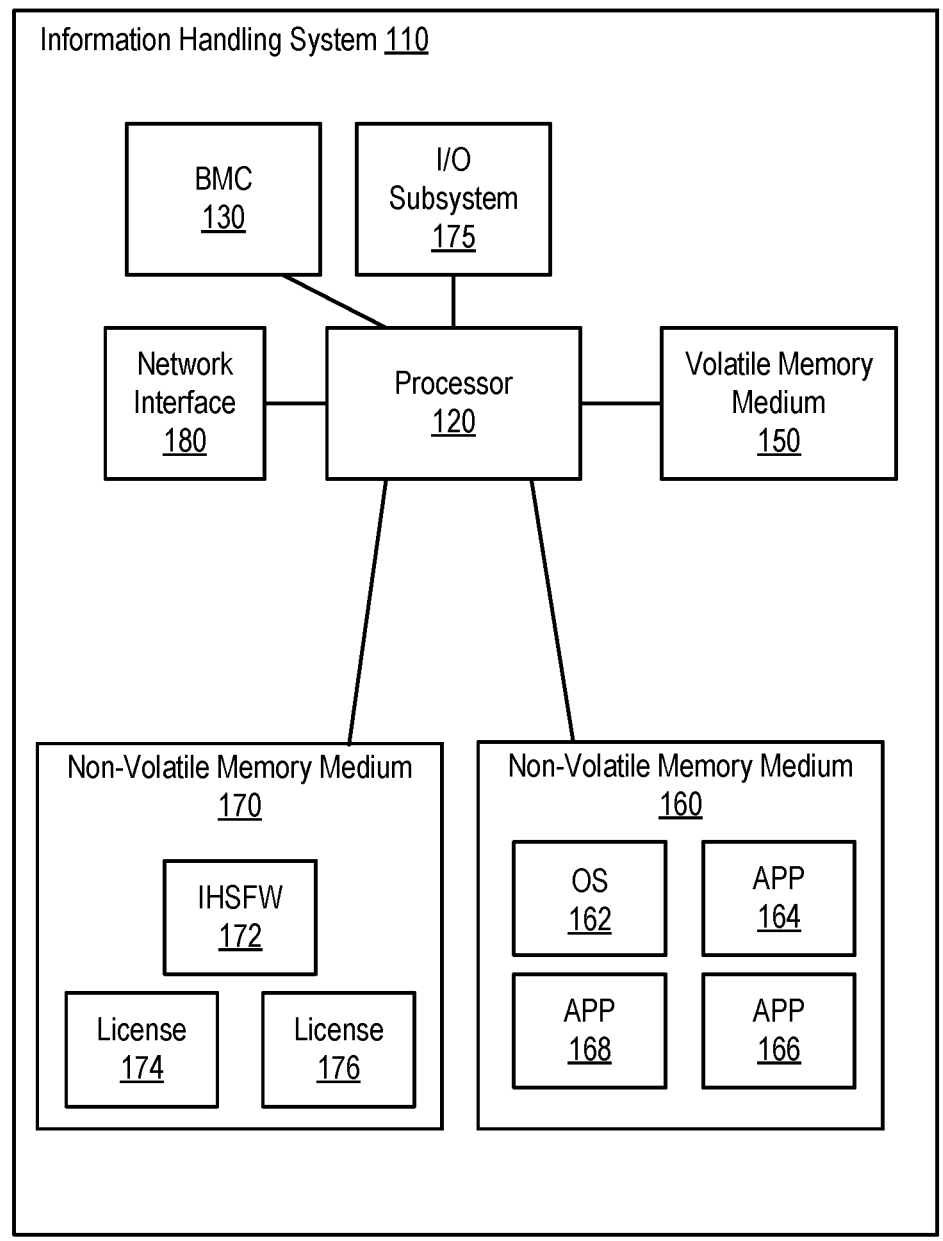
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, Silicon-as-a-Service (SiAAS) may be offered with an information handling system. For example, an operating system (OS) and/or a hypervisor may access different amounts of storage of the information handling system based at least on a license to access the amounts of storage. In one instance, the information handling system may include an amount of volatile storage, and a portion of the amount of volatile storage may be available to the OS and/or the hypervisor until a license to access the amount of volatile storage is installed on the information handling system. In another instance, the information handling system may include an amount of non-volatile storage, and a portion of the amount of non-volatile storage may be available to the OS and/or the hypervisor until a license to access the amount of non-volatile storage is installed on the information handling system. In one or more embodiments, installing a license to access additional storage may be faster than installing additional physical storage in the information handling system. For example, installing a license to access additional storage may facilitate implementing on-demand storage capacity.

In one or more embodiments, one or more information handling system firmware options may map physical storage devices to dynamically adjust an amount of storage exposed to the OS and/or the hypervisor. For example, one or more systems, one or more methods, and/or one or more processes may initialize and may map all physical storage devices but report a licensed amount of the amount of the physical storage to the OS and/or the hypervisor. In one instance, the one or more systems, the one or more methods, and/or the one or more processes may report a portion of the amount of the physical storage to the OS and/or the hypervisor. In another instance, the one or more systems, the one or more methods, and/or the one or more processes may report all of the amount of the physical storage to the OS and/or the hypervisor.

In one or more embodiments, a baseboard management controller (BMC) may implement a licensing system, which may manage different amounts of storage of the information handling system that may be accessed by the OS and/or the hypervisor. For example, a script may change an amount of storage of the information handling system that may be accessed by the OS and/or the hypervisor. In one instance, the script may include a Redfish script. In another instance, the script may include a Remote Access Controller Admin (RACADM) script.

In one or more embodiments, a reboot of the information handling system may be required for a new amount of storage of the information handling system that may be accessed by the OS and/or the hypervisor to be access by the OS and/or the hypervisor. In one or more embodiments, a reboot of the information handling system may not be required for a new amount of storage of the information handling system that may be accessed by the OS and/or the hypervisor to be access by the OS and/or the hypervisor.

In one or more embodiments, a volatile memory medium may include volatile storage. For example, a volatile memory medium may include multiple dual in-line memory modules (DIMMs). For instance, when a reboot of the information handling system may not be required for a new amount of storage of the information handling system that may be accessed by the OS and/or the hypervisor to be access by the OS and/or the hypervisor, all DIMMs of the information handling system may be mapped and trained. In one or more embodiments, a memory test may determine dual in-line memory module (DIMM) storage capacities. At a conclusion of a power-on self-test (POST), information handling system firmware may receive a license, which may be utilized to determine an amount of storage associated with the volatile memory medium that may be reported to the OS and/or the hypervisor. For example, the information handling system firmware may receive the license from a BMC of the information handling system. For instance, the information handling system firmware may read the license from the BMC of the information handling system.

In one or more embodiments, the information handling system firmware may modify an available memory size according to the license. For example, the information handling system firmware may modify the available memory size according to the license via invoking an interrupt. In one instance, the information handling system firmware may load a register (e.g., an AX register) of a processor of the information handling system with a data value of 0xE820 and may invoke an interrupt 0x15 to configure the available memory size according to the license. In another instance, the information handling system firmware may call a subroutine to configure the available memory size according to the license. As an example, the subroutine may be "gBS→GetMemoryMap( )" of the information handling system firmware. In one or more embodiments, the information handling system firmware may reserve volatile storage from individual DIMM sockets to balance a memory distribution for non-uniform memory access (NUMA) optimization.

In one or more embodiments, when the OS and/or the hypervisor loads and is executed by a processor of the information handling system, the OS and/or the hypervisor may determine the available memory size according to the license. For example, the available memory size according to the license may be less than a total memory size of physical storage installed on the information handling system. For instance, a quantity of four sixteen gigabytes (16 GB) DIMMs may be installed on the information handling system, and the OS and/or the hypervisor may determine the available memory size to be twenty gigabytes (20 GB). As an example, the remaining forty-four gigabytes (44 GB) from the quantity of four 16 GB DIMMs, which is not available to the OS and/or the hypervisor, may be considered "dark memory" as it is not available for use by the OS and/or the hypervisor.

In one or more embodiments, when a new license is received by the information handling system firmware, a new available memory size according to the new license may be increased from the available memory size according to the license. In one example, if the new license is received by the information handling system firmware, the new available memory size according to the new license may be increased from 20 GB to forty-two gigabytes (42 GB). In another example, if the new license is received by the information handling system firmware, the new available memory size according to the new license may be increased from 20 GB to sixty-four gigabytes (64 GB), which would be all of the storage provided by the quantity of four 16 GB DIMMs. In one or more embodiments, the new license may be applied to the BMC of the information handling system.

In one or more embodiments, a kernel of the OS and/or a kernel of the hypervisor may be restarted without rebooting the information handling system when an amount of available storage is increased. For example, the information handling system firmware may modify one or more interfaces associated with reporting available storage to the OS and/or the hypervisor. For instance, the newly available storage would be accessible by a restarted kernel of the OS and/or a restarted kernel of the hypervisor.

In one or more embodiments, a data structure associated with the information handling system firmware may provide address mapping for a physical memory array. For example, the data structure, which provides address mapping for the physical memory array, may be updated when the newly available storage is accessible by the OS and/or the hypervisor. In one or more embodiments, the data structure, which provides address mapping for the physical memory array, may include a table. For example, the data structure, which provides address mapping for the physical memory array, may include a system management basic input/output system (SMBIOS) table. For instance, the SMBIOS table may be compliant with a SMBIOS type nineteen (19) table, which may store information associated with physical memory of an information handling system and at least a portion of the physical memory of the information handling system available for utilization by the OS and/or the hypervisor.

In one or more embodiments, the data structure, which provides address mapping for the physical memory array, may be updated with information associated with the newly available storage. In one example, the data structure, which may provide address mapping for the physical memory array, may include a starting address and an ending address that may be set to include a valid address range. For instance, one or more of the starting address and the ending address of the data structure may be set in accordance with the newly available storage. In another example, the data structure, which may provide address mapping for the physical memory array, may include an extended starting address and an extended ending address that may be set to include a valid address range. For instance, one or more of the extended starting address and the extended ending address of the data structure may be set in accordance with the newly available storage.

In one or more embodiments, the newly available storage may be made available to the OS and/or the hypervisor via a hot-plug event. For example, hot-plugging equipment associated with an information handling system may include replacing or adding one or more components to the information handling system without stopping, shutting down, or rebooting the information handling system. For instance, when the newly available storage is made available to the OS and/or the hypervisor, the newly available storage may be determined and/or discovered by the OS and/or the hypervisor via a hot-plug event and/or a hot-plug notification. As an example, the information handling system firmware may provide a hot-plug event and/or a hot-plug notification to the OS and/or the hypervisor. For instance, the hot-plug event and/or the hot-plug notification may notify the OS and/or the hypervisor that the newly available storage may be utilized.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a BMC 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, non-volatile memory medium 170 may include a license 174. For example, license 174 may be a license for an amount of memory that is to be made available to OS 162 and/or a hypervisor. In one or more embodiments, non-volatile memory medium 170 may not include license 174 when a user (e.g., an administrator) receives IHS 110. In one example, license 174 may be obtained from an original equipment manufacturer (OEM). For instance, the OEM may be DELL™. In another example, license 174 may be obtained from a third party. For example, the third party may be a reseller of license 174. In one or more embodiments, after license 174 is obtained, license 174 may be installed in non-volatile memory medium 170.

In one or more embodiments, a license 176 may be obtained. For example, license 176 may utilized to obtain an additional amount of memory medium 150 that may be utilized with an OS and/or a hypervisor. In one or more embodiments, license 176 may be obtained from a server information handling system. For example, license 176 may be obtained, via a network, from the server information handling system. For instance, IHS 110 may be communicatively coupled to the network. In one or more embodiments, license 176 may be stored via non-volatile memory medium 170.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
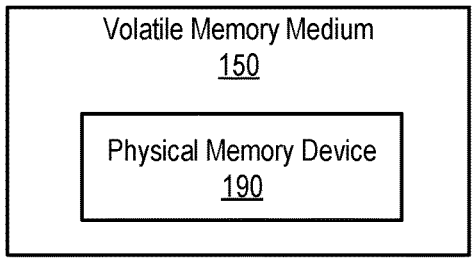
FIG. 1B illustrates an example of a volatile memory medium that includes a single physical memory device, according to one or more embodiments.

Turning now to FIG. 1B, an example of a volatile memory medium that includes a single physical memory device is illustrated, according to one or more embodiments. In one or more embodiments, volatile memory medium 150 may include a single physical memory device 190. For example, physical memory device 190 may include a DIMM.

Figure 1C:
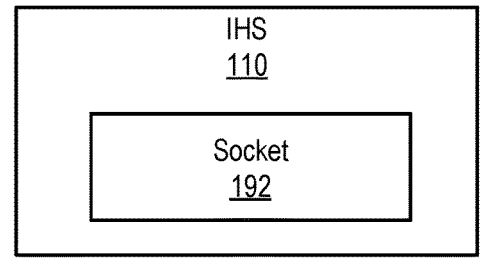
FIG. 1C illustrates an example of an information handling system that includes a single physical memory device socket, according to one or more embodiments.

Turning now to FIG. 1C, an example of an information handling system that includes a single physical memory device socket is illustrated, according to one or more embodiments. In one or more embodiments, IHS 110 may include a single physical memory device socket 192. For example, socket 192 may be a socket for physical memory device 190. For instance, physical memory device 190 may be plugged into socket 192.

Figure 1D:
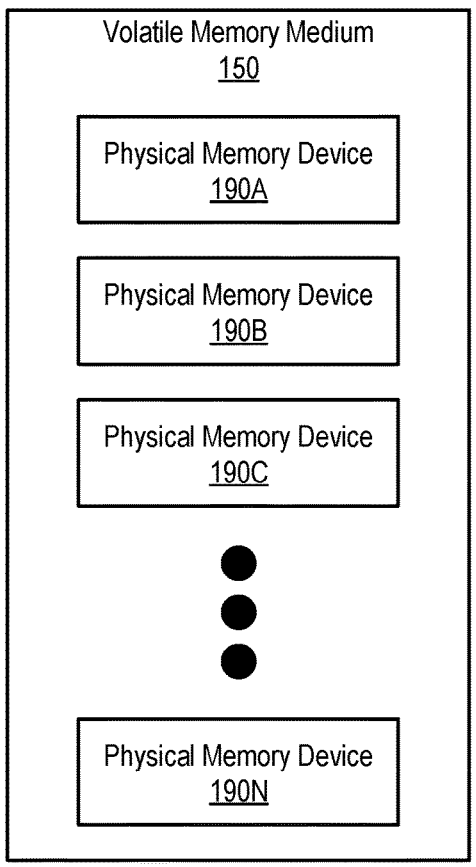
FIG. 1D illustrates an example of a volatile memory medium that includes multiple physical memory devices, according to one or more embodiments.

Turning now to FIG. 1D, an example of a volatile memory medium that includes multiple physical memory devices is illustrated, according to one or more embodiments. In one or more embodiments, volatile memory medium 150 may include multiple physical memory devices 190A-190N. For example, physical memory devices 190A-190N may respectively include multiple DIMMs. For instance, each physical memory device 190 of physical memory devices 190A-190N may include a DIMM. Although physical memory devices 190A-190N are illustrated, volatile memory medium 150 may include any number of physical memory devices 190, according to one or more embodiments.

Figure 1E:
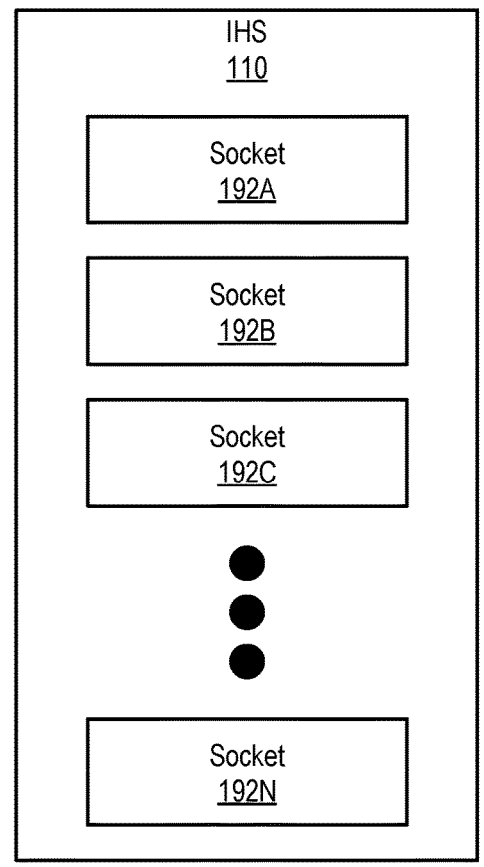
FIG. 1E illustrates an example of an information handling system that includes multiple physical memory device sockets, according to one or more embodiments.

Turning now to FIG. 1E, an example of an information handling system that includes multiple physical memory device sockets is illustrated, according to one or more embodiments. In one or more embodiments, IHS 110 may include multiple physical memory device sockets 192A-192N. For example, sockets 192A-192N may respectively be sockets for physical memory devices 190A-190N. For instance, physical memory devices 190A-190N may be respectively plugged into sockets 192A-192N. Although sockets 192A-192N are illustrated, IHS 110 may include any number of sockets 192, according to one or more embodiments. In one or more embodiments, all sockets 192 of IHS 110 may be populated with physical memory devices 190. For example, access of additional physical memory may be controlled via licenses without physically adding additional physical memory to IHS 110. In one or more embodiments, physical memory devices 190 may be removable. In one or more embodiments, physical memory devices 190 may not be removable. For example, physical memory devices 190 may be soldered to IHS 110. For instance, physical memory devices 190 may be soldered to a motherboard of IHS 110. As an example, a socket 192 may include solder pads to which a physical memory device 190 may be soldered.

Figure 2:
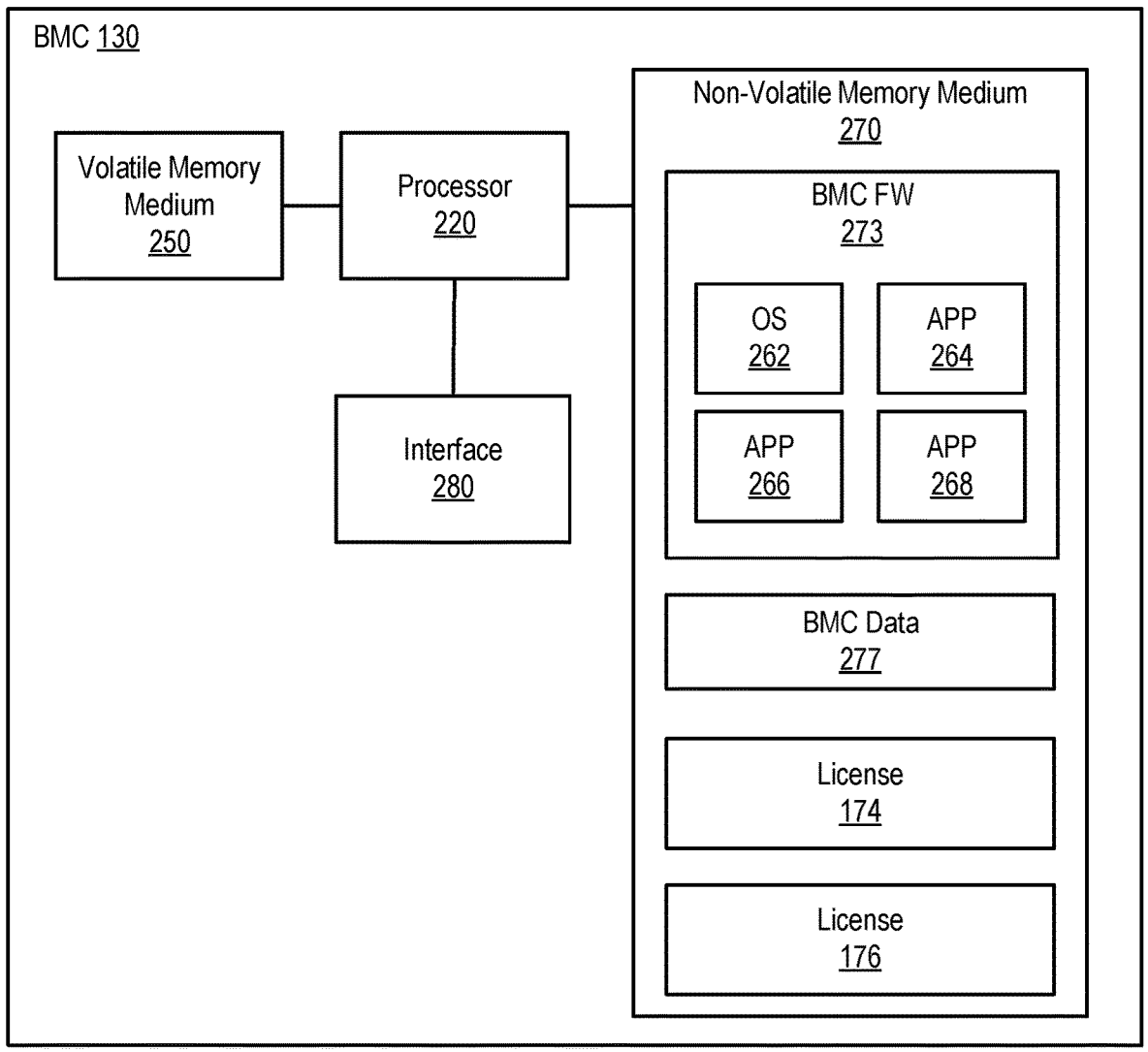
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. In one or more embodiments, non-volatile memory medium 270 may include license 174.

In one or more embodiments, BMC 130 may obtain license 176. For example, license 176 may utilized to obtain an additional amount of memory medium 150 that may be utilized with an OS and/or a hypervisor executed by IHS 110. In one or more embodiments, license 176 may be obtained from a server information handling system. For example, license 176 may be obtained, via a network, from the server information handling system. In one or more embodiments, license 176 may be stored via non-volatile memory medium 270.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry. In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
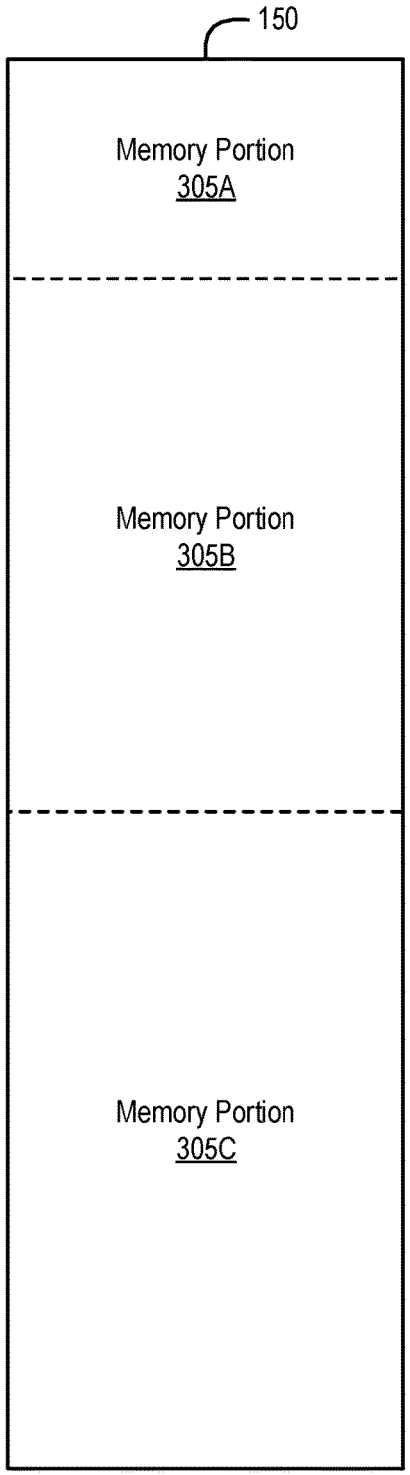
FIG. 3A illustrates an example of a memory medium, according to one or more embodiments.

Turning now to FIG. 3A, an example of a memory medium is illustrated, according to one or more embodiments. In one or more embodiments, volatile memory medium 150 may include multiple memory portions. For example, volatile memory medium 150 may include memory portions 305A-305C. In one instance, memory portion 305A may be associated with IHSFW 172. In a second instance, memory portion 305B may be associated with a first amount of physical storage associated with license 174. In a third instance, memory portion 305B may be associated with a first amount of physical storage associated with a default amount of physical storage if no license is detected. In another instance, memory portion 305C may be associated with a second amount of the physical storage. As an example, memory portion 305C may be considered "dark memory". For instance, memory portion 305C may be available for utilization by an operating system and/or a hypervisor if a second license (e.g., a license 176) is applied to IHS 110.

Figure 3B:
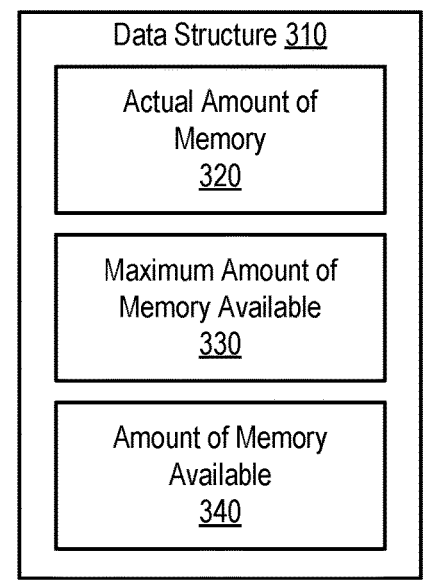
FIGS. 3B and 3C illustrate an example of a data structure, according to one or more embodiments.
Figure 3C:
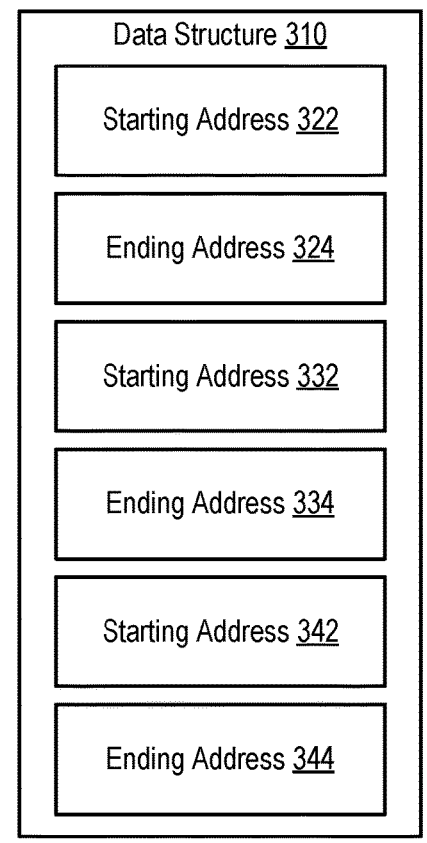

Turning now to FIGS. 3B and 3C, an example of a data structure is illustrated, according to one or more embodiments. As shown in FIG. 3B, a data structure 310 may include an actual amount of memory 320, a maximum amount of memory available 330, and an amount of memory available 340. In one or more embodiments, actual amount of memory 320 may include a total number of bytes of volatile memory medium 150. In one or more embodiments, maximum amount of memory available 330 may include a maximum number of bytes of volatile memory medium 150 that can be allocated to an operating system and/or a hypervisor. For example, maximum amount of memory available 330 may include a number of bytes of memory portions 305B and 305C.

In one or more embodiments, amount of memory available 340 may include a number of bytes of volatile memory medium 150 available to an operating system and/or a hypervisor. For example, amount of memory available 340 may include a number of bytes of memory portion 305B available an operating system and/or a hypervisor. In one instance, amount of memory available 340 may include a number of bytes of memory portion 305B available an operating system and/or a hypervisor when license 174 is detected. In another instance, amount of memory available 340 may include a number of bytes of memory portion 305B available an operating system and/or a hypervisor when no license is detected.

In one or more embodiments, memory portion 305A may store data structure 310. In one example, data structure 310 may include an ACPI table. In another example, data structure 310 may include a SMBIOS table. As illustrated in FIG. 3C, data structure 310 may include a starting address 322 and an ending address 324. In one example, starting address 322 may include a starting address of memory portion 305A. In another example, ending address 324 may include an ending address of memory portion 305A. As shown, data structure 310 may include a starting address 332 and an ending address 334. In one example, starting address 332 may include a starting address of memory portion 305B. In another example, ending address 334 may include an ending address of memory portion 305B. As illustrated, data structure 310 may include a starting address 342 and an ending address 344. In one example, starting address 342 may include a starting address of memory portion 305C. In another example, ending address 344 may include an ending address of memory portion 305C.

In one or more embodiments, when license 174 is utilized, starting address 332 may include a starting address of memory portion 305B, and ending address 334 may include an ending address of memory portion 305B. When no license is detected, for example, starting address 332 may include a starting address of memory portion 305B, and ending address 334 may include an ending address of memory portion 305B. In one or more embodiments, when license 176 is utilized, starting address 332 may include a starting address of memory portion 305B, and ending address 334 may include an address of memory portion 305C. For example, memory portion 305B may be extended to include at least a portion of memory portion 305C, when license 176 is utilized. For instance, memory portion 305B may be extended when license 176 is utilized.

In one or more embodiments, when license 176 is utilized, starting address 332 may include a starting address of memory portion 305B, and ending address 334 may include an ending address of memory portion 305C. For example, memory portion 305B may be extended to include memory portion 305C, when license 176 is utilized. For instance, memory portion 305B may be extended when license 176 is utilized. In one or more embodiments, an operating system and/or a hypervisor may access starting address 332 and ending address 334. In one example, the operating system may allocate storage between starting address 332 and ending address 334 to the operating system, to one or more applications, and/or to one or more hypervisors. In another example, the hypervisor may allocate storage between starting address 332 and ending address 334 to the hypervisor and/or to one or more virtual machines.

Figure 4:
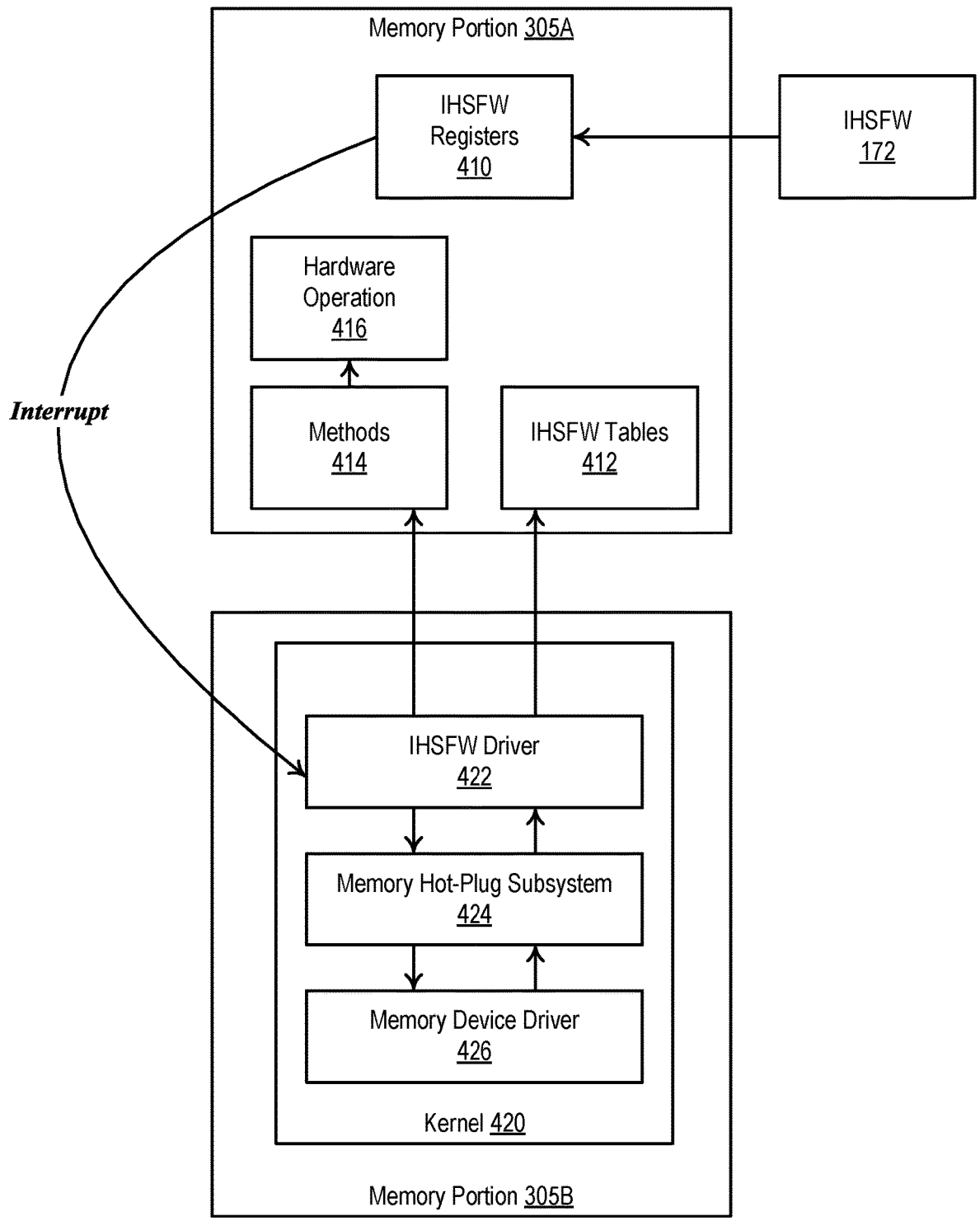
FIG. 4 illustrates an example of a hot add process, according to one or more embodiments.

Turning now to FIG. 4, an example of a hot add process is illustrated, according to one or more embodiments. In one or more embodiments, memory portion 305A may include IHSFW registers 410. For example, IHSFW 172 may modify one or more of IHSFW registers 410. In one instance, IHSFW 172 may modify one or more of IHSFW registers 410 in response to determining that an information handling system component is added to IHS 110. In another instance, IHSFW 172 may modify one or more of IHSFW registers 410 when an information handling system component is not added to IHS 110. In one or more embodiments, IHSFW registers 410 may include ACPI registers.

In one or more embodiments, an interrupt may be generated when one or more of IHSFW registers 410 are modified. For example, IHSFW 172 may generate an interrupt may be generated when one or more of IHSFW registers 410 are modified. For instance, the interrupt may be a system control interrupt (SCI). In one or more embodiments, a IHSFW driver 422 of a kernel 420 may handle the interrupt generated when one or more of IHSFW registers 410 are modified. For example, IHSFW driver 422 may include an ACPI driver. As illustrated, memory portion 305B may include kernel 420. In one example, an operating system may include kernel 420. In another example, a hypervisor may include kernel 420.

In one or more embodiments, IHSFW driver 422 may call an event handler, which may handle the interrupt generated when one or more of IHSFW registers 410 are modified. For example, a memory hot plug subsystem 424 of kernel 420 may include the event handler. In one or more embodiments, memory hot plug subsystem 424 may call a subroutine associated with device dependent processor instructions. For example, a memory device driver 426 of kernel 420 may include the subroutine associated with device dependent processor instructions. In one or more embodiments, the subroutine may determine that at least one hardware memory component has been added to IHS 110. For example, the subroutine may determine that at least one physical memory device 190 has been added to IHS 110.

In one instance, the subroutine may determine that at least one physical memory device 190 has been added to IHS 110 when the at least one physical memory device 190 has actually been added to IHS 110. In another instance, the subroutine may determine that at least one physical memory device 190 has been added to IHS 110 when the at least one physical memory device 190 has not actually been added to IHS 110. As an example, the at least one physical memory device 190 may have already been installed in IHS 110 but may not have been made available to an operating system and/or a hypervisor. For instance, the at least one physical memory device 190 may have already been installed in IHS 110 but may not have been made available to kernel 420.

In one or more embodiments, memory device driver 426 may access memory hot plug subsystem 424. For example, memory hot plug subsystem 424 may utilize an application programming interface (API) to access IHSFW driver 422. In one or more embodiments, IHSFW driver 422 may call a method of methods 414. For example, the method of methods 414 may be an ACPI method. In one or more embodiments, IHSFW driver 422 may call the method of methods 414 in response to memory hot plug subsystem 424 utilizing the API to access IHSFW driver 422.

In one or more embodiments, the method of methods 414 may invoke a hardware operation 416. In one example, hardware operation 416 may include processor instructions, which may access information associated with the at least one physical memory device 190 that has been added to IHS 110. In another example, hardware operation 416 may include processor instructions, which may access information associated with the at least one physical memory device 190 that has already been installed in IHS 110 but has not been previously available to an operating system and/or a hypervisor. For instance, hardware operation 416 may include processor instructions, which may access information associated with the at least one physical memory device 190 that has already been installed in IHS 110 but has not been previously available to kernel 420.

In one or more embodiments, hardware operation 416 may access data structure 310. For example, hardware operation 416 may access data structure 310 to retrieve starting address 332 and/or ending address 334. In one or more embodiments, IHSFW driver 422 may access IHSFW tables 412. In one example, one or more of IHSFW tables 412 may include data structure 310. In another example, IHSFW tables 412 may include information associated with data structure 310. In one or more embodiments, IHSFW tables 412 may include one or more ACPI tables. In one or more embodiments, memory portion 305A may include IHSFW registers 410, IHSFW tables 412, methods 414, and hardware operation 416.

Figure 5A:
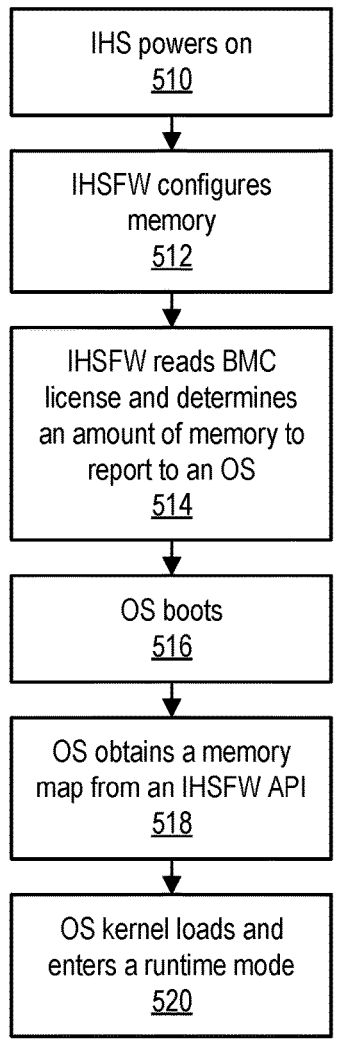
FIG. 5A illustrates an example of a method of configuring an operating system to utilize an amount of memory, according to one or more embodiments.

Turning now to FIG. 5A, an example of a method of configuring an operating system to utilize an amount of memory is illustrated, according to one or more embodiments. At 510, an information handling system may power on. For example, IHS 110 may power on. At 512, information handling system firmware may configure memory. For example, IHSFW 172 may configure memory. For instance, IHSFW 172 may configure volatile memory medium 150. As an example, IHSFW 172 may configure physical memory device 190. As another example, IHSFW 172 may configure physical memory devices 190A-190N.

At 514, the information handling system may read a BMC license and may determine an amount of memory to report to an OS. For example, IHSFW 172 may receive a license from BMC 130 and may determine an amount of memory to report to OS 162 based at least on the license. In one or more embodiments, if a license is not available, a default amount of memory may be reported to the OS. For example, if IHSFW 172 does not receive a license from BMC 130, IHSFW 172 may report a default amount of memory to OS 162. At 516, the OS may boot. For example, OS 162 may boot. At 518, the OS may obtain a memory map from an information handling system firmware API. For example, OS 162 may obtain a memory map from an IHSFW API. For instance, the IHSFW API may utilize a management information exchange. As an example, OS 162 may obtain a memory map via one or more of WMI and CIM, among others. At 520, an OS kernel may load and may enter a runtime mode. For example, a kernel of OS 162 may load and may enter a runtime mode.

Figure 5B:
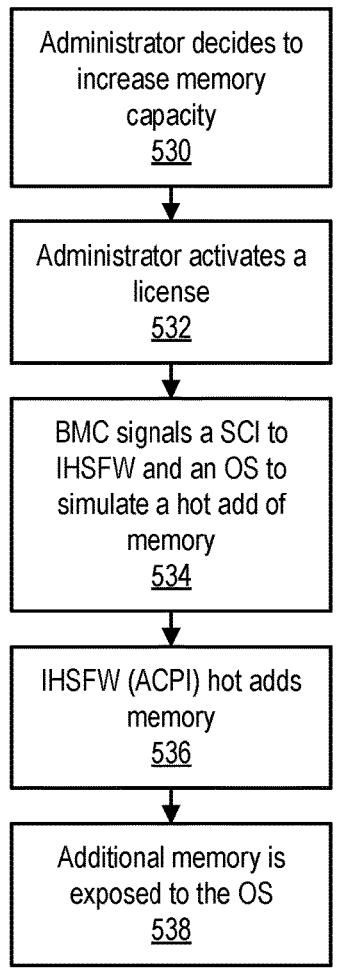
FIG. 5B illustrates an example of a method of permitting an operating system to utilize additional memory, according to one or more embodiments.

Turning now to FIG. 5B, an example of a method of permitting an operating system to utilize additional memory is illustrated, according to one or more embodiments. At 530, an administrator (e.g., a user) may decide to increase a memory capacity of an information handling system. For example, an administrator may decide to increase a memory capacity of IHS 110 to utilize with one or more of OS 162 and APPs 164-168, among others. At 532, the administrator may active a license to increase the memory capacity of the information handling system. For example, the administrator may active a license to increase the memory capacity of IHS 110 to utilize with one or more of OS 162 and APPs 164-168, among others.

At 534, a BMC may signal a SCI to the information handling system firmware and an operating system to simulate a hot add of memory. For example, BMC 130 may invoke an interrupt (e.g., a SCI) to IHSFW 172 and OS 162 to simulate a hot add of memory. For instance, BMC 130 may invoke the interrupt via GPIO. As an example, BMC 130 may invoke the interrupt via interface 280, which may be communicatively coupled to processor 120. For instance, BMC 130 may invoke the interrupt via signal to a platform controller hub of processor 120. In one or more embodiments, BMC 130 may modify one or more registers of IHSFW 172 to simulate a hot add of memory. For example, BMC 130 may modify one or more IHSFW registers 410 (illustrated in FIG. 4). For instance, BMC 130 may modify one or more ACPI registers to simulate a hot add of memory. At 536, the information handling system firmware may hot add the memory. For example, IHSFW 172 may hot add additional memory based at least on license 176. At 538, the additional memory may be exposed to the operating system. For example, additional memory based at least on license 176 may be exposed to OS 162.

Figure 5C:
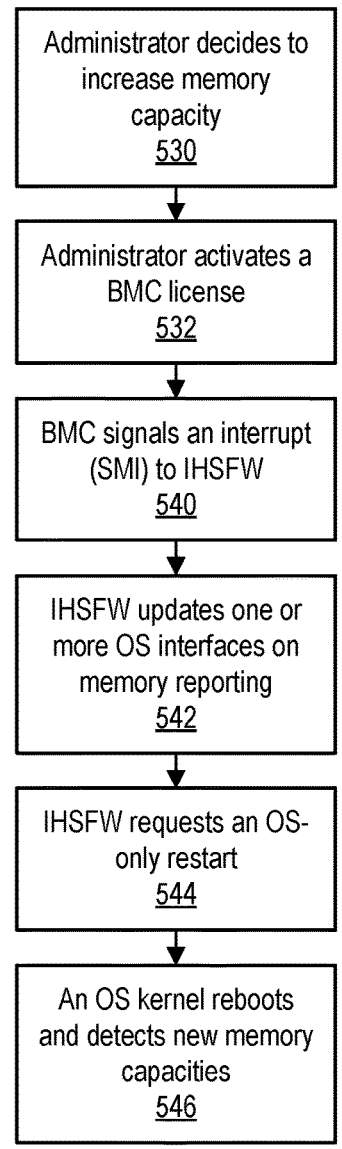
FIG. 5C illustrates another example of a method of permitting an operating system to utilize additional memory, according to one or more embodiments.

Turning now to FIG. 5C, another example of a method of permitting an operating system to utilize additional memory is illustrated, according to one or more embodiments. At 530, an administrator (e.g., a user) may decide to increase a memory capacity of an information handling system. For example, an administrator may decide to increase a memory capacity of IHS 110 to utilize with one or more of OS 162 and APPs 164-168, among others. At 532, the administrator may active a license to increase the memory capacity of the information handling system. For example, the administrator may active a license to increase the memory capacity of IHS 110 to utilize with one or more of OS 162 and APPs 164-168, among others.

At 540, a BMC may signal an interrupt to information handling system firmware. For example, BMC 130 may signal an interrupt to IHSFW 172. For example, the interrupt may be a system management interrupt (SMI). At 542, the information handling system firmware may update one or more OS interfaces on memory reporting. For example, IHSFW 172 may one or more interfaces associated with OS 162 to report additional memory to OS 162. For instance, one or more data structures that OS 162 utilizes to obtain an amount of memory that it may utilize and/or allocate to one or more applications may be modified with information associated with the additional memory.

At 544, IHSFW may request an OS-only restart. For example, IHSFW 172 may request a kernel of OS 162 to restart. For instance, the kernel of OS 162 may be restarted without restarting and/or rebooting IHS 110. As an example, kernel 420 may be restarted without restarting and/or rebooting IHS 110. At 546, an operating system kernel may reboot and may detect new memory capacities. For example, the kernel of OS 162 may reboot and may detect the additional memory. For instance, kernel 420 may reboot and may detect the additional memory.

Figure 6:
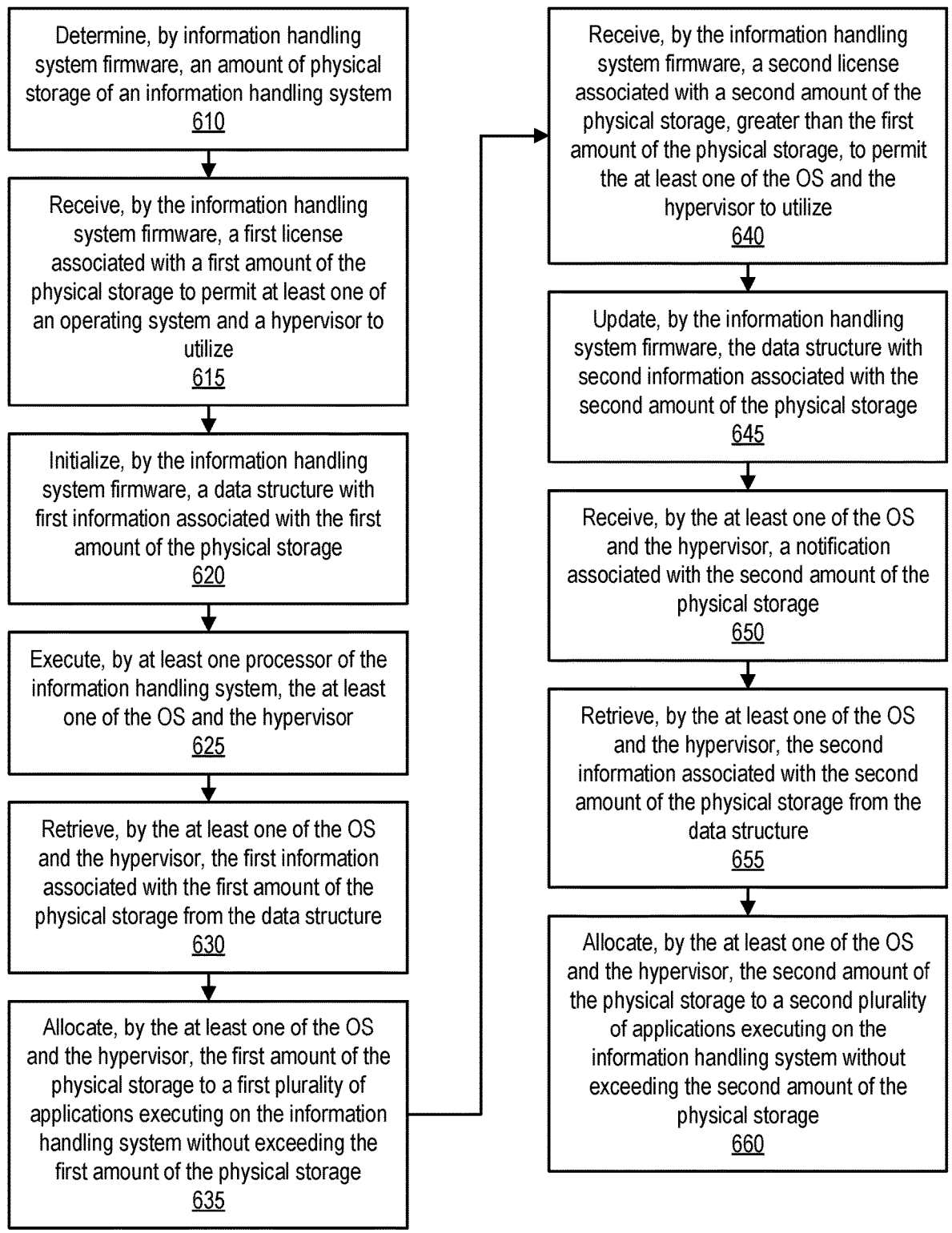
FIG. 6 illustrates an example of a method of operating an information handling system, according to one or more embodiments.

Turning now to FIG. 6, an example of a method of operating an information handling system is illustrated, according to one or more embodiments. At 610, an amount of physical storage of an information handling system may be determined by information handling system firmware. In one or more embodiments, IHSFW 172 may determine an amount of physical storage of IHS 110. In one example, the physical storage of IHS 110 may include volatile memory medium 150. For instance, the amount of physical storage of IHS 110 may be determined by IHSFW 172, which may determine the amount of physical storage of IHS 110 to be a number of bytes of volatile memory medium 150. In another example, the physical storage of IHS 110 may include non-volatile memory medium 160.

At 615, a first license associated with a first amount of the physical storage to permit at least one of an OS and a hypervisor to utilize may be received by the information handling system firmware. For example, IHSFW 172 may receive license 174 associated with a first amount of the physical storage to permit at least one of OS 162 and a hypervisor to utilize. For instance, the first amount of the physical storage may include a number of bytes of memory portion 305B (illustrated in FIG. 3A).

At 620, a data structure with first information associated with the first amount of the physical storage may be initialized by the information handling system firmware. In one or more embodiments, IHSFW 172 may initialize a data structure 310 with first information associated with the first amount of the physical storage. In one example, the first information associated with the first amount of the physical storage may include starting address 332 (shown in FIG. 3C). For instance, starting address 332 may be initialized with a starting address of memory portion 305B. In another instance, the first information associated with the first amount of the physical storage may include ending address 334 (shown in FIG. 3C). For instance, ending address 334 may be initialized with an ending address of memory portion 305B.

At 625, the at least one OS and the hypervisor may be executed by at least one processor of the information handling system. For example, processor 120 may execute the at least one of OS 162 and the hypervisor. At 630, the first information associated with the first amount of the physical storage from the data structure may be retrieved the at least one of the OS and the hypervisor. For example, the at least one of OS 162 and the hypervisor may retrieve the first information associated with the first amount of the physical storage from data structure 310.

In one or more embodiments, the first information associated with the first amount of the physical storage may include a starting address of the physical storage and a first ending address of the physical storage, among others. In one example, the at least one of OS 162 and the hypervisor may retrieve starting address 332. In another example, the at least one of OS 162 and the hypervisor may retrieve ending address 334.

At 635, the first amount of the physical storage may be allocated to first multiple applications executing on the information handling system without exceeding the first amount of the physical storage. For example, the at least one of OS 162 and the hypervisor may allocate the first amount of the physical storage to first multiple applications executing on the information handling system without exceeding the first amount of the physical storage.

At 640, a second license associated with a second amount of the physical storage, greater than the first amount of the physical storage, to permit the at least one of the OS and the hypervisor to utilize may be received by the information handling system firmware. For example, IHSFW 172 may receive license 176 associated with a second amount of the physical storage, greater than the first amount of the physical storage. In one or more embodiments, license 176 may expire after an amount of time transpiring. For example, license 176 may expire at a future date.

At 645, the data structure may be updated by the information handling system firmware with second information associated with the second amount of the physical storage. In one or more embodiments, IHSFW 172 may update data structure 310 with second information associated with the second amount of the physical storage. In one example, IHSFW 172 may update starting address 332 with a starting address of the second amount of the physical storage. In a second example, starting address 332 may not be updated. In a third example, ending address 334 may be updated with an address of memory portion 305C (shown in FIG. 3A). In another example, ending address 334 may be updated with ending address 344 (illustrated in FIG. 3C).

At 650, a notification associated with the second amount of the physical storage may be received by the at least one of the OS and the hypervisor. For example, a notification associated with the second amount of the physical storage may be received by the at least one of OS 162 and the hypervisor. For instance, a notification associated with the second amount of the physical storage may be received by kernel 420 (shown in FIG. 4).

In one or more embodiments, the information handling system firmware may provide the notification associated with the second amount of the physical storage to the at least one of the OS and the hypervisor. For example, providing the notification may include generating an interrupt that signals a hot add of additional storage to the at least one of the OS and the hypervisor. For instance, providing the notification may include generating an interrupt that signals a hot add of additional storage to kernel 420. Although no physical hardware has been physically added to the information handling system, the information handling system firmware may generate an interrupt that signals a hot add of additional storage to the at least one of the OS and the hypervisor, according to one or more embodiments. For example, the information handling system firmware may generate an interrupt that signals a hot add of additional storage to kernel 420, although no physical hardware has been physically added to the information handling system.

At 655, the second information associated with the second amount of the physical storage from the data structure may be retrieved by the at least one of the OS and the hypervisor. In one or more embodiments, the at least one of OS 162 and the hypervisor may retrieve the second information associated with the second amount of the physical storage from data structure 310. In one example, the at least one of OS 162 and the hypervisor may retrieve starting address 332. In another example, the at least one of OS 162 and the hypervisor may retrieve ending address 334. In one or more embodiments, retrieving the second information associated with the second amount of the physical storage from the data structure may be performed in response to receiving the notification.

At 660, the second amount of the physical storage may be allocated to second multiple applications executing on the information handling system without exceeding the second amount of the physical storage. For example, the at least one of OS 162 and the hypervisor may allocate the second amount of the physical storage to second multiple applications executing on the information handling system without exceeding the second amount of the physical storage. In one or more embodiments, the second multiple applications may include the first multiple applications.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system to:
   determine, by information handling system firmware, an amount of physical storage of an information handling system;
   receive, by the information handling system firmware, a first license associated with a first amount of the physical storage to permit at least one of an operating system (OS) and a hypervisor to utilize;
   initialize, by the information handling system firmware, a data structure with first information associated with the first amount of the physical storage;
   execute, by the at least one processor, the at least one of the OS and the hypervisor;
   retrieve, by the at least one of the OS and the hypervisor, the first information associated with the first amount of the physical storage from the data structure;
   allocate, by the at least one of the OS and the hypervisor, the first amount of the physical storage to a first plurality of applications executing on the information handling system without exceeding the first amount of the physical storage;
   receive, by the information handling system firmware, a second license associated with a second amount of the physical storage, greater than the first amount of the physical storage, to permit the at least one of the OS and the hypervisor to utilize;
   update, by the information handling system firmware, the data structure with second information associated with the second amount of the physical storage;
   receive, by the at least one of the OS and the hypervisor, a notification associated with the second amount of the physical storage;
   in response to receiving the notification, retrieve, by the at least one of the OS and the hypervisor, the second information associated with the second amount of the physical storage from the data structure; and
   allocate, by the at least one of the OS and the hypervisor, the second amount of the physical storage to a second plurality of applications executing on the information handling system without exceeding the second amount of the physical storage.

2. The information handling system of claim 1, wherein the instructions further cause the information handling system to:
provide, by the information handling system firmware, the notification associated with the second amount of the physical storage to the at least one of the OS and the hypervisor.

3. The information handling system of claim 2, wherein, to provide the notification, the instructions further cause the information handling system to generate an interrupt that signals a hot add of additional storage to the at least one of the OS and the hypervisor.

4. The information handling system of claim 1,
wherein the first information associated with the first amount of the physical storage includes a starting address of the physical storage and a first ending address of the physical storage; and
wherein the second information associated with the second amount of the physical storage includes the starting address of the physical storage and a second ending address of the physical storage.

5. The information handling system of claim 4,
wherein, to allocate the first amount of the physical storage to the first plurality of applications, the instructions further cause the information handling system to allocate portions of the first amount of the physical storage between the starting address and the first ending address; and
wherein, to allocate the second amount of the physical storage to the second plurality of applications, the instructions further cause the information handling system to allocate portions of the second amount of the physical storage between the starting address and the second ending address.

6. The information handling system of claim 1, wherein the second plurality of applications includes the first plurality of applications.

7. The information handling system of claim 1, wherein the physical storage is volatile memory.

8. A method, comprising:
determining, by information handling system firmware, an amount of physical storage of an information handling system;
receiving, by the information handling system firmware, a first license associated with a first amount of the physical storage to permit at least one of an operating system (OS) and a hypervisor to utilize;
initializing, by the information handling system firmware, a data structure with first information associated with the first amount of the physical storage;
executing, by at least one processor of the information handling system, the at least one of the OS and the hypervisor;
retrieving, by the at least one of the OS and the hypervisor, the first information associated with the first amount of the physical storage from the data structure;
allocating, by the at least one of the OS and the hypervisor, the first amount of the physical storage to a first plurality of applications executing on the information handling system without exceeding the first amount of the physical storage;
receiving, by the information handling system firmware, a second license associated with a second amount of the physical storage, greater than the first amount of the physical storage, to permit the at least one of the OS and the hypervisor to utilize;
updating, by the information handling system firmware, the data structure with second information associated with the second amount of the physical storage;
receiving, by the at least one of the OS and the hypervisor, a notification associated with the second amount of the physical storage;
in response to the receiving the notification, retrieving, by the at least one of the OS and the hypervisor, the second information associated with the second amount of the physical storage from the data structure; and
allocating, by the at least one of the OS and the hypervisor, the second amount of the physical storage to a second plurality of applications executing on the information handling system without exceeding the second amount of the physical storage.

9. The method of claim 8, further comprising:
providing, by the information handling system firmware, the notification associated with the second amount of the physical storage to the at least one of the OS and the hypervisor.

10. The method of claim 9, wherein the providing the notification includes generating an interrupt that signals a hot add of additional storage to the at least one of the OS and the hypervisor.

11. The method of claim 8,
wherein the first information associated with the first amount of the physical storage includes a starting address of the physical storage and a first ending address of the physical storage; and
wherein the second information associated with the second amount of the physical storage includes the starting address of the physical storage and a second ending address of the physical storage.

12. The method of claim 11,
wherein the allocating the first amount of the physical storage to the first plurality of applications includes allocating portions of the first amount of the physical storage between the starting address and the first ending address; and
wherein the allocating the second amount of the physical storage to the second plurality of applications includes allocating portions of the second amount of the physical storage between the starting address and the second ending address.

13. The method of claim 8, wherein the second plurality of applications includes the first plurality of applications.

14. The method of claim 8, wherein the physical storage is volatile memory.

15. A computer-readable non-transitory memory medium that includes instructions that, when executed by at least one processor of an information handling system, cause the information handling system to:
determine, by information handling system firmware, an amount of physical storage of an information handling system;
receive, by the information handling system firmware, a first license associated with a first amount of the physical storage to permit at least one of an operating system (OS) and a hypervisor to utilize;
initialize, by the information handling system firmware, a data structure with first information associated with the first amount of the physical storage;
execute, by the at least one processor, the at least one of the OS and the hypervisor;

retrieve, by the at least one of the OS and the hypervisor, the first information associated with the first amount of the physical storage from the data structure;

allocate, by the at least one of the OS and the hypervisor, the first amount of the physical storage to a first plurality of applications executing on the information handling system without exceeding the first amount of the physical storage;

receive, by the information handling system firmware, a second license associated with a second amount of the physical storage, greater than the first amount of the physical storage, to permit the at least one of the OS and the hypervisor to utilize;

update, by the information handling system firmware, the data structure with second information associated with the second amount of the physical storage;

receive, by the at least one of the OS and the hypervisor, a notification associated with the second amount of the physical storage;

in response to receiving the notification, retrieve, by the at least one of the OS and the hypervisor, the second information associated with the second amount of the physical storage from the data structure; and allocate, by the at least one of the OS and the hypervisor, the second amount of the physical storage to a second plurality of applications executing on the information handling system without exceeding the second amount of the physical storage.

16. The computer-readable non-transitory memory medium of claim 15, wherein the instructions further cause the information handling system to:
provide, by the information handling system firmware, the notification associated with the second amount of the physical storage to the at least one of the OS and the hypervisor.

17. The computer-readable non-transitory memory medium of claim 16, wherein, to provide the notification, the instructions further cause the information handling system to generate an interrupt that signals a hot add of additional storage to the at least one of the OS and the hypervisor.

18. The computer-readable non-transitory memory medium of claim 15,
wherein the first information associated with the first amount of the physical storage includes a starting address of the physical storage and a first ending address of the physical storage; and
wherein the second information associated with the second amount of the physical storage includes the starting address of the physical storage and a second ending address of the physical storage.

19. The computer-readable non-transitory memory medium of claim 18,
wherein, to allocate the first amount of the physical storage to the first plurality of applications, the instructions further cause the information handling system to allocate portions of the first amount of the physical storage between the starting address and the first ending address; and
wherein, to allocate the second amount of the physical storage to the second plurality of applications, the instructions further cause the information handling system to allocate portions of the second amount of the physical storage between the starting address and the second ending address.

20. The computer-readable non-transitory memory medium of claim 15, wherein the physical storage is volatile memory.

* * * * *